(12) United States Patent
Miller et al.

(10) Patent No.: US 7,993,731 B2
(45) Date of Patent: Aug. 9, 2011

(54) HARD SURFACE-VENEER ENGINEERED SURFACING TILES

(75) Inventors: Robert J. Miller, Dalton, GA (US); Jean Briere, Ooltewah, TN (US)

(73) Assignee: Shaw Industries Group, Inc., Dalton, GA (US)

( * ) Notice: Subject to any disclaimer, the term of this patent is extended or adjusted under 35 U.S.C. 154(b) by 579 days.

(21) Appl. No.: 10/833,880

(22) Filed: Apr. 28, 2004 (Under 37 CFR 1.47)

(65) Prior Publication Data
US 2006/0154015 A1 Jul. 13, 2006

(51) Int. Cl.
*B32B 7/02* (2006.01)

(52) U.S. Cl. .............. 428/212; 428/49; 428/57; 428/88; 428/96; 428/220; 428/325; 428/411.1; 52/390; 52/391; 52/392

(58) Field of Classification Search .................. 428/57, 428/49, 88, 96, 325, 410, 44, 48, 50, 212, 428/220, 411.1; 52/390, 391, 392
See application file for complete search history.

(56) References Cited

U.S. PATENT DOCUMENTS

| | | | |
|---|---|---|---|
| 623,923 A | 4/1899 | Molle et al. | |
| 636,200 A | 10/1899 | Frink et al. | |
| 680,468 A | 8/1901 | Sierer et al | |
| 850,274 A | 4/1907 | Staples | |
| 2,882,714 A | 4/1959 | Gagle at al. | 72/25 |
| 2,999,431 A | 9/1961 | Mitchell | 94/13 |
| 3,287,203 A | 11/1966 | Elmendorf | 161/123 |
| 3,548,559 A | 12/1970 | Levine et al. | 52/619 |
| 3,554,850 A | 1/1971 | Kuhle | 161/38 |
| 3,625,807 A | 12/1971 | Beemer | 161/38 |
| 3,657,852 A | 4/1972 | Worthington et al. | 52/591 |
| 3,694,983 A | 10/1972 | Couquet | 52/384 |
| 3,770,536 A | 11/1973 | Haigh | 156/71 |
| 3,878,030 A | 4/1975 | Cook | 428/45 |
| 3,900,644 A | 8/1975 | Sackoff et al. | 428/40 |
| 3,940,528 A | 2/1976 | Roberts | 428/161 |
| 3,988,187 A | 10/1976 | Witt et al. | 156/71 |
| 4,055,451 A | 10/1977 | Cockbain et al. | 156/89 |
| 4,218,496 A | 8/1980 | Savignac | 427/263 |
| 4,242,390 A | 12/1980 | Nemeth | 428/47 |
| 4,248,922 A | 2/1981 | Shortway et al. | 428/159 |
| 4,307,140 A | 12/1981 | Davis | 428/86 |
| 4,339,489 A | 7/1982 | Barker et al. | 428/167 |
| 4,554,769 A | 11/1985 | Fujii et al. | 52/173 |
| 4,796,402 A | 1/1989 | Pajala | 52/390 |
| 4,832,995 A | 5/1989 | McLauchlin | 428/49 |
| 4,840,825 A | 6/1989 | Aristodimou | 428/77 |
| 4,931,331 A | 6/1990 | Owens | 428/47 |
| 5,062,913 A | 11/1991 | Owens et al. | 156/154 |
| 5,182,892 A | 2/1993 | Chase | 52/539 |
| 5,208,086 A | 5/1993 | Owens | 428/47 |
| 5,226,402 A | 7/1993 | Marocco | 125/12 |
| 5,295,341 A | 3/1994 | Kajiwara | 52/586.2 |
| 5,314,554 A | 5/1994 | Owens | 156/154 |
| 5,401,343 A | 3/1995 | Owens | 156/89 |
| 5,437,934 A | 8/1995 | Witt et al. | 428/537.1 |
| 5,438,809 A | 8/1995 | Ehrlich | 52/390 |
| 5,502,939 A | 4/1996 | Zadok et al. | 52/309.9 |
| 5,605,141 A | 2/1997 | Bilotta | 125/16.02 |
| 5,894,700 A * | 4/1999 | Sweet | 52/391 |
| 5,976,689 A * | 11/1999 | Witt et al. | 428/339 |
| 5,985,397 A * | 11/1999 | Witt et al. | 428/44 |
| 6,006,486 A | 12/1999 | Moriau et al. | 52/589.1 |
| 6,247,286 B1 | 6/2001 | Heyns | 52/589.1 |
| 6,343,451 B1 | 2/2002 | Chih et al. | 52/390 |
| 6,363,677 B1 | 4/2002 | Chen et al. | 52/586.1 |
| 6,401,415 B1 | 6/2002 | Garcia | 52/311.1 |
| 6,408,584 B1 | 6/2002 | Rodriguez | 52/390 |
| 6,413,618 B1 | 7/2002 | Parker et al. | 428/195 |
| 6,460,303 B1 | 10/2002 | Pacione | 52/311.2 |
| 6,490,836 B1 | 12/2002 | Moriau et al. | 52/589.1 |
| 6,517,915 B1 | 2/2003 | Banus | 428/15 |
| 6,659,097 B1 | 12/2003 | Houston | 125/12 |
| 6,803,110 B2 | 10/2004 | Drees et al. | 428/423.7 |
| 6,823,638 B2 | 11/2004 | Stanchfield | 52/588.1 |
| 2001/0029716 A1 | 10/2001 | Schnabel et al. | 52/389 |
| 2002/0100231 A1 | 8/2002 | Miller et al. | 52/177 |
| 2002/0148185 A1 | 10/2002 | Garduno | 52/390 |
| 2003/0029117 A1 | 2/2003 | Moriau et al. | 52/592.1 |

FOREIGN PATENT DOCUMENTS

| | | |
|---|---|---|
| EP | 0 123 136 A2 | 10/1984 |
| EP | 0 246 856 A2 | 11/1987 |
| GB | 2 117 813 | 10/1983 |
| JP | 2000-274054 | 10/2000 |
| WO | WO 79/01149 | 12/1979 |
| WO | WO 91/05929 | 5/1991 |
| WO | WO 02/58924 | 1/2001 |
| WO | WO 02/48477 | 12/2001 |
| WO | WO 02/055810 | 7/2002 |
| WO | WO 02/075074 | 9/2002 |

* cited by examiner

OTHER PUBLICATIONS

Loran O'Bannon, Dictionary of Ceramic Science and Engineering, Plenum Press, Jun. 1984, pp. 125, 169.*

*Primary Examiner* — David Sample
*Assistant Examiner* — Lawrence D Ferguson
(74) *Attorney, Agent, or Firm* — Ballard Spahr LLP (57) ABSTRACT

A modular tile assembly having a substantially rigid substrate, at least one sealant layer, and at least one stone, ceramic, or porcelain tile. A bottom surface of a first sealant layer being bonded to an upper surface of the substrate and a top surface of a second sealant layer being bonded to a lower surface of the substrate. The tile being bonded to at least a portion of the top surface of the first sealant layer. In one example, the substrate is provided with a tongue or a groove defined in any one, combination, or each of the respective side edges of the substrate, as desired.

10 Claims, 5 Drawing Sheets

HARD SURFACE-VENEER ENGINEERED SURFACING TILES

CROSS REFERENCE TO RELATED APPLICATIONS

This application claims priority to and the benefit of U.S. Pat. No. 7,442,423, filed on Apr. 28, 2003, the entire disclosure of which is hereby incorporated by reference in its entirety for all purposes.

FIELD OF THE INVENTION

This invention relates generally to tiles for use in architectural applications, including flooring or wall covering applications. More particularly, the invention relates to an engineered, veneer, hard surface tile assembly that has a stone or ceramic tile connected to an underlying substrate. In one aspect, the invention relates to pre-sized tile assembly comprising a hard surface layer of ceramics, porcelains, marbles, granites or stone.

BACKGROUND OF THE INVENTION

Laminated constructs for structural and decorative use in the building and home improvement trades is now widely accepted throughout the industry for a wide range of applications. Notably, laminated engineered wood flooring is now replacing conventional, natural wood flooring due to enhanced uniformity, durability, and appearance while facilitating installation and maintenance. Such flooring typically features a substrate/core (base) onto which a decorative/wood grain upper layer is laminated. As the engineering and designs improve for such laminated flooring, attributable to the evolution of improved core/base structures and wood or patterned veneered surfaces, the more widespread the engineered flooring has become. However, such laminated wood structures exhibit limitations in use, particularly restricting use to interior applications in dry areas of the home. In other words, moisture in a bathroom or kitchen may cause damage to such flooring by, for example, inducing separation of the laminated upper layer from its underlying core.

Even the hardest hardwood/wood laminate flooring products with the most durable finishes (highest on the Janka scale) do not remotely approximate the strength and performance of ceramics, glass, or natural stone such as marble and granite. Moreover, unlike tile or polished stone, hardwoods must be sealed periodically to provide a surface finish protecting against penetration of moisture by the otherwise naturally absorptive wood surface. Even typically more durable engineered wood laminate flooring, suffers from water/moisture damage because no glue or other moisture resistant filler is applied between each board, plank or square. Thus, moisture can penetrate into and be absorbed by the joint area and or sub-floor.

Moisture separation of common laminates is exhibited, for example, in Formica® countertops where heating and moisture cycles induce separation of the plastic layer from the underlying supporting base. Furthermore, notwithstanding the best efforts of the designers and artists of certain imitation hard materials, e.g., marble, granite, ceramic, the simulated ceramics, marbles, granites and/or stones do not truly replicate the look and feel or durability of the authentic product. Consequently, such laminates are not only susceptible to damage and wear which necessitates refinishing and or replacement within much shorter life cycles than other building material products like brick, ceramics or natural stones, but, simply put, they are clearly artificial.

Ceramics, marble, granite and stone are preferred for durability and beauty. Ceramic tiles and natural stone provide durable surfaces with a wide range of sizes from small mosaic tiles (e.g. 1 cm.×1 cm.) to meter by meter slabs. The natural colorings, unique textures ranging from smooth high gloss to rough non-skid slate type finishes, provide the designer/architect with endless appearance options. It is also well recognized, that natural stone and ceramic tiles also are extremely resistant to environmental changes such as climate and humidity. They can withstand variations in temperature from well below freezing to extremely high, ambient temperatures such as those experienced at hot springs. Correspondingly, such materials are generally impervious from humidity changes and handily survive in the most arid conditions to the most humid conditions, and more significantly, changes in ordinary ambient humidity, e.g., from 20% to 100%.

One well-known and costly disadvantage of using ceramic and natural stone tiles is the degree of complexity in installation, installation expertise, installation companion materials and surface preparation required to successfully complete the installation process. In the case of modern home construction and remodeling, flooring is typically installed over wood sub floors. Such sub-floors regularly require reinforcement in order to limit the amount of deflection or movement the base floor will allow. Additional layers of reinforcing plywood or cementitious sheets must be glued and fastened first. Without additional joist and/or truss reinforcement to firmly support the new flooring, the degree of deflection of the sub-floor will compromise the integrity of the upper floor.

Conventional installation of tile contemplates individual sizing, complex grinding/cutting, and careful layout on the prepared floor. The time-honored approach to achieve proper installation is to create a visible reference grid and following the grid lines throughout the installation process to preserve tile alignment. The next step requires mixing large amounts of cement materials, about 1-4 pounds per square foot of tile to be installed, followed by spreading this cement material, typically by hand, to obtain a desired thickness/proportion on the upper surface of the sub-floor. Each tile is then manually positioned and aligned according to the reference grid. As such, the installation process is both labor and time intensive and costly. In modern practice, installation by an experienced craftsman will average about 10-20 sq ft per hour maximum.

Sizing of specific tiles to conform to requirements of the installation is achieved by use of a wet saw which requires water for blade cooling and cleaning during the cutting process, where, for example, a tile must be shaped or reduced in size to accommodate an obstruction (pipe) or stationary fixture. Users of wet saws know that they do not provide the flexibility found in smaller skill and power saws more traditionally used in the building materials industry. Once the tiles have been set on the cement, they must be undisturbed to cure/dry for 12 to 24 hours during which temperatures must remain above about 52° F. (11° C.). After the tiles have set for an appropriate time, the excess cement is removed, any spacers/spacing adjuncts removed and debris cleaned away. If properly laid out, the spacing between adjacent tile will possess a degree of uniformity which is filled by application of a grout of a preferred color, typically a dyed cementitious composition, in the spaces between the tiles. After the grout dries, any residue is cleaned from the tile surfaces. Typically, the grout is allowed at least one full day of setting/drying time (without traffic). Conventional cemetatious grout is known as the weakest and least durable portion of a tile floor as it is prone to failures such as cracking from movement or settling of the substructure and or tile as well as staining and discoloration from normal use and traffic. Likewise, conventional grout is notoriously difficult to maintain and clean due to its porosity and rough texture. The foregoing problems and issues clearly show that conventional tile/natural stone flooring is subject to both structural failures and or installation difficulties that may result in cracked or loose tiles and/or grout. Furthermore, installation requires considerable time and skill.

Further, significant issues associated with natural stone and ceramic products concern transport, storage and handling. In all cases, conventional tiles/flooring stone, e.g., marble or granite, are notoriously expensive to ship and store due to their natural weight and packing requirements. Handling such materials is also expensive due to the weight and fragility of larger tiles. Another significant problem associated with shipping, for example, pre-sized marble tiles, is the cost for packaging and protection of the content against chipping and breakage. Where such tile products are cut/processed/manufactured, for example, in Italy, the tiles must be carefully secured in packaging designed for shipping by both land vehicles and containers.

A need thus exists for a modular tile assembly with a ceramic or stone tile having the ease of use and installation of a laminated board, and for such a tile assembly that may be used in both flooring and wall covering applications.

SUMMARY OF THE INVENTION

The present invention provides a modular tile assembly that overcomes some of the deficiencies of the known types of wood veneer or laminated boards and of known ceramic tiles, respectively. This is accomplished by providing a modular tile assembly, which has a ceramic or stone tile, and a ceramic or stone tile faced installation, respectively.

In one aspect, the modular tile assembly of the invention is comprised of a ceramic or stone surface tile, a sealant layer, and a substrate. In one example, the substrate may have a tongue or a complementary groove defined in at least one, a plurality, or in all of its respective peripheral side edges. The sealant layer is mounted onto an upper surface of the substrate. This may be accomplished by any known means of joining a sealant film to the substrate, and may include, for example, using an adhesive to join the sealant layer, in the form of a conventional film, to the upper surface of the substrate, or spraying and bonding a conventional settable material onto the upper surface of the substrate to form the sealant layer. The ceramic or stone surface tile is mounted to a top surface of the sealant layer by any known means of bonding a stone or ceramic material to another material, such as, for example, conventional adhesives.

As exemplified, in another aspect, the engineered veneer tiles of the present invention comprise a generally planar base of selected dimensions and configuration. The base having an upper surface, a lower surface, a first edge that can incorporate a first cooperating element of an interlocking member, and a second edge that can incorporate a second cooperating element of said interlocking member. The tile also includes a veneer layer having a Mohs hardness of greater than 4 and a thickness of between 2 and 8 mm affixed to the upper surface of said base being dimensioned so as not to overlie said first cooperating element.

In still another aspect, matable engineered tiles are provided in which each tile comprises a relatively rigid and generally planar core having a thickness of between 4 and 12 mm, at least one sealant layer, and a veneer surface layer. The core has upper and lower surfaces and at least a first and a second edge, the first edge incorporating a first cooperating element of an interlocking member, and the second edge incorporating a second cooperating element of said interlocking member. In use, engaging the first and second cooperating elements creates the interlocking member. The upper veneer surface layer has a generally planar configuration and is composed of material having a Mohs hardness greater than 3 and a thickness of between 2 and 10 mm.

In another aspect, engineered tiles are provided that include a stable, substantially rigid, generally planar substructure sheet having a thickness of between 4 and 10 mm and defining an upper and lower surface of a select geometric configuration. The sheet has at least a first edge and a second edge where the first edge features a tongue structure projecting therefrom in a plane generally parallel to the upper core surface and the second edge includes a groove recess corresponding in shape and dimension to the tongue-like structure is inserted of the first edge. In use, the tongue structure of the first edge into the groove structure of the second edge of an adjoining sheet to interconnect abutting engineered tiles. A veneer layer is connected to the upper surface of the sheet and is composed of a material selected from the group consisting of sliceable natural stone, marble, granite, slate, and ceramics, where said veneer has a thickness of 3-10 mm and possesses a Mohs hardness of at least 3.

The ceramic or stone surface tile is comprised of a known ceramic or porcelain material or a natural or artificial stone material, for example a natural marble, slate, or granite. The tile has a length and a width dimension that may be complementary to that of the underlying substrate or may have a length and width dimension that is fractionally smaller than the underlying substrate.

The tile assemblies may be formed separately, or in an alternate construction, a number of the tiles may be and mounted to a common substrate. In this example, the substrate may again have one of a tongue or a groove, as desired, defined in at least one of the respective peripheral side edges of the substrate. If formed separately, the tile assemblies are joined to one another along their edges in conventional fashion, as would be done for laminated wood flooring, for example. Once joined to one another, a joint line, a gap, or a seam may be present in some form between adjoining tile assemblies and may be grouted or caulked, for example, with a conventional grout or caulk to complete the sealing of the formed surface of the tile floor.

The individual tile assemblies may be of any desired size (length and width), and may be a single tile assembly, or comprise a series of tiles bonded onto a common carrier or substrate, as described above. Preferably, the invention further provides a tile structure that is easily sized using standard cutting saws to conform to installation requirements.

In one embodiment, the modular tile assembly of the invention is comprised of a ceramic or stone surface tile, a sealant layer, and a substrate. In one example, the substrate may have a tongue or a complementary groove defined in at least one, a plurality, or in all of its respective peripheral side edges. The sealant layer is mounted onto an upper surface of the substrate. This may be accomplished by any known means of joining a sealant film to the substrate, and may include, for example, using an adhesive to join the sealant layer, in the form of a conventional film, to the upper surface of the substrate, or spraying and bonding a conventional settable material onto the upper surface of the substrate to form the sealant layer. The ceramic or stone surface tile is mounted to a top surface of the sealant layer by any known means of bonding a stone or ceramic material to another material, such as, for example, conventional adhesives.

The present provides invention structures and methods for glueless surface installation of engineered tiles in a minimum of time with a minimum of cost where the finished surface covering is both secure and durable as well as providing a professionally installed appearance. In brief, the present invention provides a novel engineered tile panel structure and method substituting for conventional ceramic tile/stone/marble/slate slab construction. The invention overcomes the deficiencies of the known systems and structures and is suitable for architectural uses, including flooring and/or wall covering applications.

BRIEF DESCRIPTION OF THE DRAWINGS

These and other features of the embodiments of the invention will become more apparent in the following detailed description in which reference is made to the appended drawings wherein.

DETAILED DESCRIPTION OF THE INVENTION

The present invention is more particularly described in the following examples that are intended as illustrative only since numerous modifications and variations therein will be apparent to those skilled in the art. Thus, the embodiments of this invention described and illustrated herein are not intended to be exhaustive or to limit the invention to the precise form disclosed. They are chosen to describe or to best explain the principles of the invention and its application and practical use to thereby enable others skilled in the art to best utilize the invention. As used in the specification and in the claims, "a," "an," and "the" can mean one or more, depending upon the context in which it is used. The preferred embodiment is now described with reference to the figures, in which like numbers indicate like parts throughout the figures.

As used herein "connected" includes physical, whether direct or indirect, permanently affixed or adjustably mounted. Thus, unless specified, "connected" is intended to embrace any operationally functional connection.

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

As used herein "Stone" means marble, granite, limestone, slate, or other cuttable/sliceable natural stone materials.

As used herein "Ceramic" means monocuttura ceramic, porcelain ceramic, or multi-casted ceramic processed material. Ceramic embraces natural materials pressed from clays and other natural raw materials into a shape and then fired in a kiln to harden. These materials can be manufactured through known industry processes like Monocuttura (meaning single fired), Monoporosa (single fired wall tile process), Porcelain (lower porosity body which can be glazed or unglazed to achieve the desired aesthetic or structure effect) or casting (multicasting and other similar methods of wet slurry sheet type process). Ceramic production pressing processes are primarily used for the production of 'Porcelain' and single firing 'Monocottura' (once fired) floor tiles. These processes dominate worldwide ceramic tile production.

As used herein "Porcelain" means a category of ceramic belonging to the general classification and group of low or non-porous materials, with or without glaze. Typically, porosity ranges from 3% absorption in the body to nearly zero or completely vitrified (water absorption<to 0.1% defining a product as fluid impervious and frost resistant). The surface hardness of porcelain ceramics typically exceeds a rating of 5 on the Mohs mineral hardness scale and the material typically exhibits a breaking modulus greater than 10 N/mm$^2$ and preferably greater than 30 N/mm$^2$ Present porcelain tile typology categories include plain colors, small grain mixtures of various colours that are composed of at least two varying grains all of equal size or of various diameter. The porcelain may incorporate elaborations with powder dust-pressing mixtures of various colors and shapes obtained by application during the pressing phase, surface decorations of various colours and shapes obtained by salt and/or oxide serigraphic applications.

As used herein Mohs Hardness possesses its conventional meaning. The Mohs Scale, numerically identifies materials by hardness based on standard minerals, from 1 (softest) to 10 (hardest) as follows: Talc, Gypsum, Clacite, Fluorite, Apatite, Orthoclase, Quartz, Topaz, Corundum, and Diamond.

As used herein, Janka hardness, means the measure of the hardness of woods in pounds per square inch. Examples of Janka hardness of woods, which have a Mohs rating of less than 1 range from the hardest, Brazilian ebony (Janka Hardness of 3692), through oak (white and red) 1360 and 1260 respectively, to the soft woods such as pine with a rating of 690.

In one embodiment, the invention comprises glass-tile/ceramic-tile/marble/granite/stone veneered surface material of reduced thickness (thinner dimension) than conventional surfaces traditional use (between 3 and 8 mm in thickness) which is laminated through a conventional adhesive bonding process to a core substructure or panel. The substructure or core, in a square or rectangular configuration, preferably incorporates, along two of the opposing edges, a profiled structure contemplated for interlocking the abutting and confronting tile edges together where the veneer layers are separated by a grout gap of defined width. The profiling may be in the form of a traditional tongue or groove or may incorporate more sophisticated interlocking profiles such as those disclosed and described in U.S. Pat. Nos. 6,006,486 and 6,490,836, (Moriau et al/Unilin Beeher BV), which for those disclosures are incorporated herein by reference. Preferably, the veneer edges along the non-interlocking panel edges include a predefined gap to allow for fixed dimensional spacing between the panels corresponding to the grout gap spacing of the interlocking edges. As contemplated, the non-interlocking edges are conformed so that the use of glue or adhesive along the seams thereof, is optional and dependant on the environment. For example, an application of a waterproof adhesive along the seam in a bathroom floor installation may be desirable.

Figure 1:
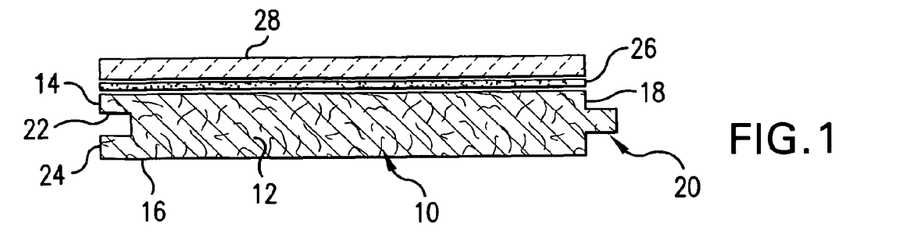
FIG. 1 is a cross-sectional view of an engineered tile panel according to one embodiment of the invention.
Figure 2:
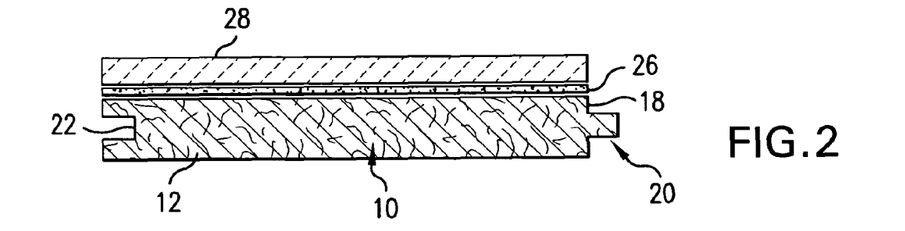
FIG. 2 is a cross-sectional view of an engineered tile panel according to an alternative exemplary embodiment of the invention.

Referring now to FIGS. 1 and 2 two preferred embodiments of an engineered tile panel of the invention are illustrated. The hard surface, veneered tile panel 10 is a unitary, laminated, planar member that does not require secondary reinforcement material backing. The tile panel 10, has a fiberboard core or base 12 which includes a generic tongue profile 20 projecting medially between the upper planar surface 14 and the lower planar surface 16 of the coreboard along the edge 18 of the coreboard 12. The tongue profile can be discontinuous but preferably is coextensive with the edge 18. A groove 22 is disposed along the opposite edge 24 and is dimensioned to receive and interlock with the tongue profile 20. The coreboard thickness ranges from 4 to 12 mm so that the laminated panel tile 10 conforms in thickness to conventional ceramic and stone tile thickness.

In one example, the coreboard 12 can be composed from a processed wood or paper material. A preferred coreboard material is 6.8 mm HDF (High density Fiberboard) which exhibits appropriate resistance to bending or bowing suitable for most flooring applications. It should be readily apparent that if cost is not an issue, the laminated hard surface tile of the instant invention may be formed from materials possessing equivalent or superior rigidity, strength, and flexibility properties to those of HDF such as certain metal or synthetics which exhibit relatively dimensional stable base for the intended service environment of the installed engineered panels.

The upper surface 14 of the coreboard 12 has disposed thereon a thin layer of an appropriate convention water impervious adhesive 26 typically ranging from 0.05 to 0.75 mm in thickness but preferably about 0.2 mm. The adhesive layer 26 secures the veneer surface 28 to the upper coreboard surface, and, thus, to the coreboard 12. However, the adhesive preferably possess some flexibility to reduce risk of loss, particularly during transport and or handling damage to the finished veneer and or the bond of the finished veneer to the core. Compensating for some movement is also preferred to minimize damage associated with natural movement and substructure movement or deflection inherent in most building materials and design structures.

The veneer surface 28 is formed from a relatively thin layer of natural stone, processed stone, ceramic, or glass having a Mohs hardness of from 3 to 8 and a thickness of from 2 to 8 mm depending on the particular material comprising the veneer. In FIG. 1, a veneer with a thickness of 3 mm is illustrated while in FIG. 2, the veneer is 8 mm. The veneer may extend across the entire upper coreboard surface but preferably is recessed by a predetermined space to form 0.0125 inch (3.17 mm) pre-established, uniform. preferably about grouting gaps 30 between veneers 28 on adjacent tiles. The veneers may be beveled, preferably about 1 mm, along the upper peripheral edges to provide for a generally smooth, uniform finish.

Figure 3:
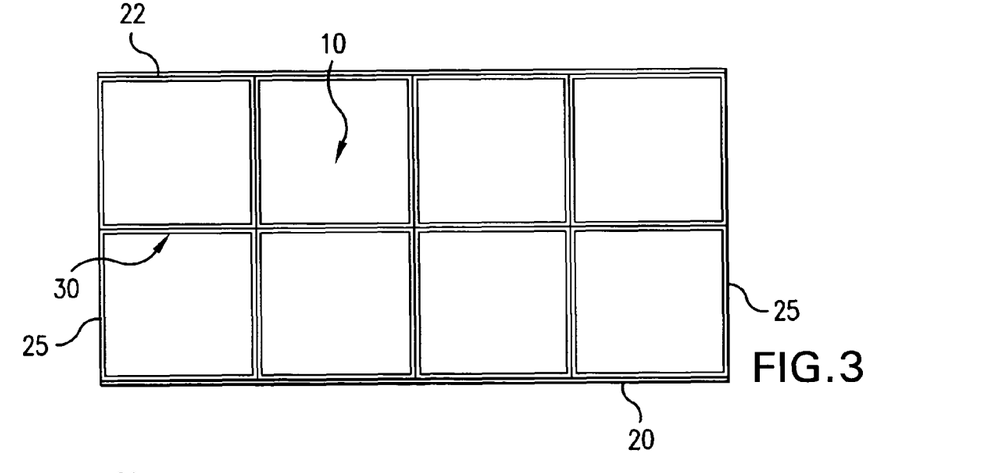
FIG. 3 is a top view of an assembly of eight, square, engineered tiles in accordance with the invention.
Figure 4:
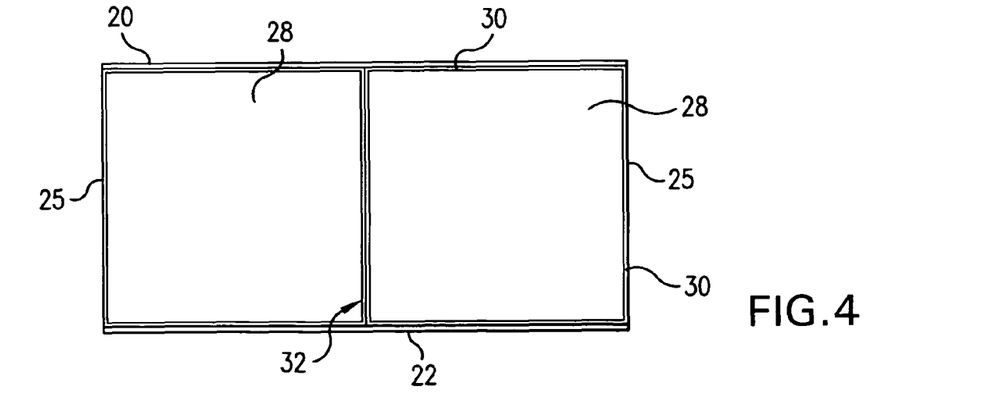
FIG. 4 is a top view of an assembly of a panel comprising a pair of square, engineered veneer surfaces in accordance with the invention.
Figure 5:
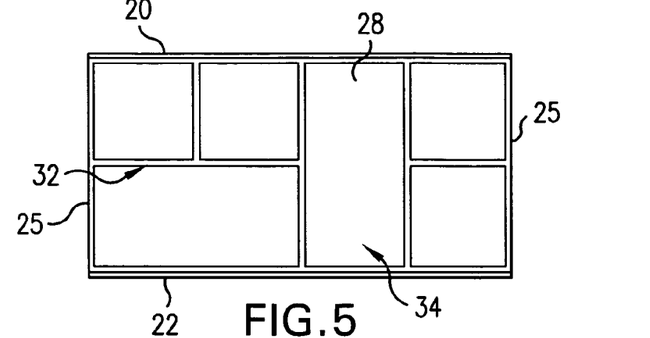
FIG. 5 is a top view of an assembly of another panel comprising six engineered tile veneers in accordance with the invention where the tile veneers are of different sizes.

FIGS. 3 through 5 illustrate top views of the veneer tiles and panels composed of two or more tiles. FIG. 3 depicts veneer tiles assembled in a conventional four-square arrangement using exemplary 6×6 inch (15.2 cm$^2$) tiles. The tile panels each feature the profiled (tongue and groove) features disposed along two opposite edges and include two non-profiled end-abutting edges 25. The grout gap border is established by the specific sizing and placement of the veneer 28 affixed to the coreboard 12. In one example, the veneer 28 is dimensioned to recess approximately 1/16 inch (1.5 mm) from the edge of the coreboard 12 and set on the coreboard in a manner to provide the pre-engineered grout gap. As can be observed from this arrangement, the tiles incorporate a substantially uniform 1/8 inch grout gap border 30 (scale exaggerated in the drawing). It should be readily appreciated that where a design is intended to have a non-uniform effect, e.g., a rustic/antique look, the grout gap 30 may be engineered to provide an intentionally non-uniform appearance.

Machining of the veneer must replicate the intended configuration for the tile so that it or the intended combination of several such tiles conforms to the underlying base 12. The individual veneer layer may be of any desired shape or size. However, the preferred polygonal form is a quadrilateral, either a square or rectangular. The hard-surface veneer contemplated by the present invention is permitted some variation but such variations must fall within a small range of tolerances in order to preserve the uniform appearance of the finished floor and to maintain structural integrity. Consequently tolerances in length and width should be less than exceed about 2/100 inch (0.5 mm). Veneer thickness variations should be less than 2%.

The adhesive layer, preferably of a waterproof composition, is disposed on the upper surface 14 of the panel 10 by conventional deposition of a uniform bead or doctored layer of quick drying/activated adhesive, hot glue, and the like and receives the veneer 28. In one example, PUR (Polyurethane Resin) may be used as the adhesive. In one example, the adhesive layer 26 can be applied to the top of the panel using spray nozzle type application methodologies with no greater than 1 inch in bead spacing thus creates a surface bond of at least 60% coverage between the core 12 and veneer 28. In addition to possessing water resistance, PUR glue or adhesive should exhibit some elasticity/flexibility to allow the substrate panel to independently change in dimension or twist and or bend greater than about 2 mm per lineal foot without severing or causing failure to the bond between the veneer and the panel.

FIG. 4 depicts a rectangular panel (a single coreboard) having mounted thereon a pair of veneers 28. As in this example, the veneers 28 include a 1/16 inch peripheral border grout gap 30 and integrally formed 1/8 inch grout gap 32 extending between the two tile veneers 28. It should be readily appreciated that the depth of the grout gap corresponds to the thickness of the veneer and any contribution from the underlying adhesive 26 on the coreboard 12. The grouting material used in connection with this invention is conventional and preferably is flexible, possesses permanent elasticity, and be essentially water/fluid impervious after curing.

The grouting material should meet or exceed ASTM C-920, Class 25, Class A requirements for elastomeric joint filler. Thus, a material may be a cured single-component or multi-component cold-applied elastomeric joint sealant that is used for sealing clay and stone base products in residential and commercial applications. Although the sealant/grout should be waterproof after curing, to meet this standard, it can be a latex based (water soluble) material which provides ease of flow during application and be cleanable/dissolvable in water before curing. Preferably, the grout is supplied in a caulking tube form to simplify installation. Moreover, the preformed "plastic grout" can incorporate a range of pre-mixed colorants to provide a coordinated appearance while exhibiting permanent flexibility, non-porosity, adequate adhesion, and weather and mildew resistance that yields a relatively non-porous surface which facilitates maintenance.

FIG. 5 depicts a variation of a single, rectangular panel 34 according to the invention which has a total of six veneer tiles of two different sizes, arranged in a pre-set pattern. The panel 34, as above, incorporates a peripheral border grout gap 30 as well as "internal" ⅛ grout gaps 32. The rectangular periphery of the panel 34 includes a tongue 20 and a groove 22 (profiling) formed along the opposing long edges thereof and a pair of non-profiled edges 25 adapted for direct abutment with coreboards of adjacent panels.

Figure 6:
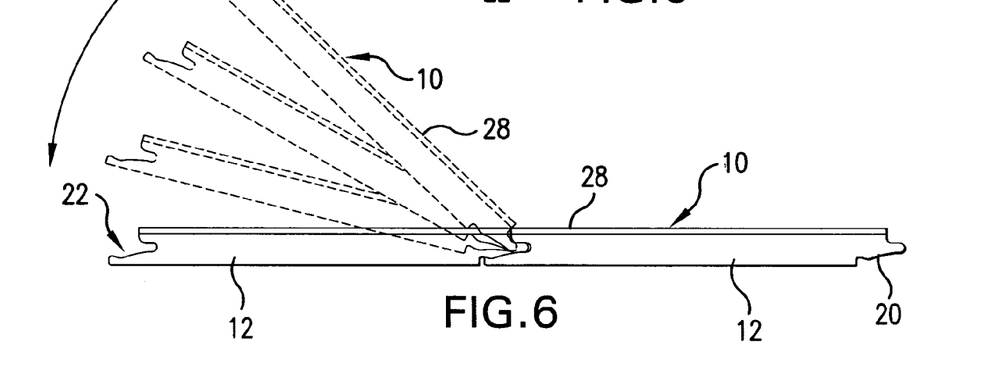
FIG. 6 is a representational side view of interlocking two engineered tiles using a profiled tongue and groove locking system.
Figure 7:
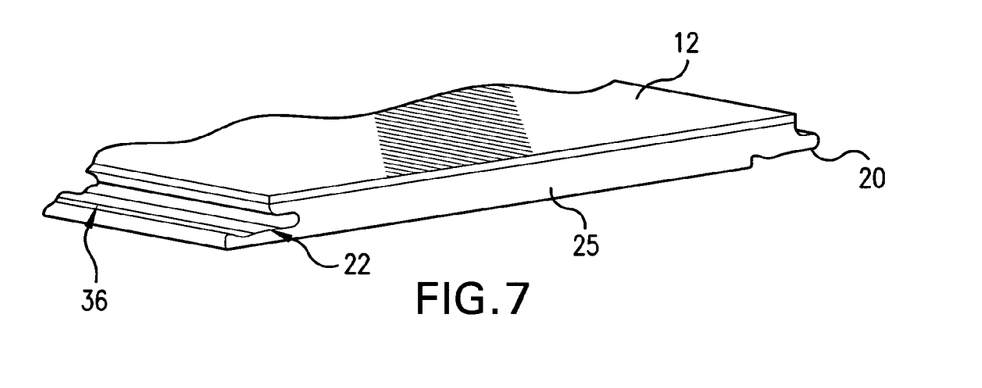
FIG. 7 is a perspective view of an elongated tile according to the invention illustrating a non-interlocking edge
Figure 8:
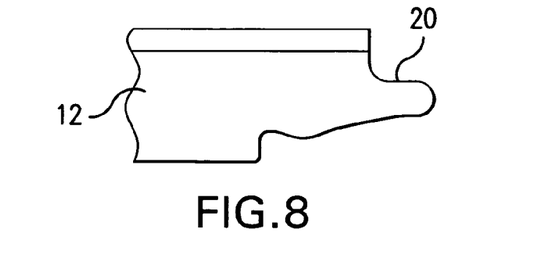
FIG. 8 is an enlarged view of a tongue locking profile according to the embodiment of the invention depicted in FIG. 6.
Figure 9:
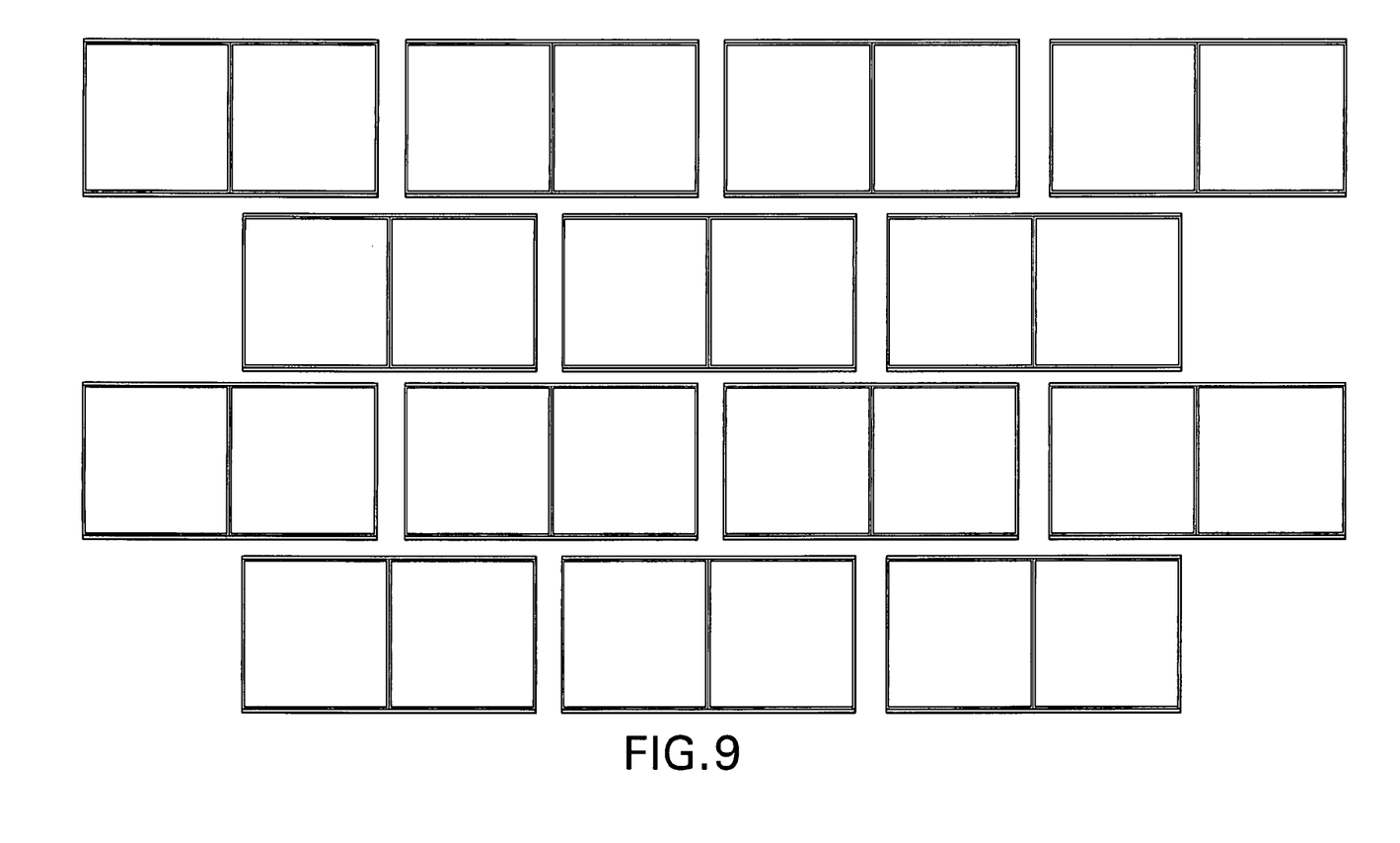
FIG. 9 is a top assembly view of a staggered tile array of a further embodiment of the invention.

FIGS. 6-8 represent an exemplified installation of a tile panel 10 with an adjacent tile panel 10 in accordance with the invention. Here the tongue and groove profiles correspond to the those disclosed in U.S. Pat. No. 6,006,486 and U.S. Pat. No. 6,490,836 and particularly the discussion relating to the structure depicted in FIG. 22 of the those patents for glueless flooring installation. The profile tongue and groove are provided with locking elements which, in engaged condition with the panels in a common plane, exert a tension force upon each other, as a result of which the engaged tile panels 10 are forced towards each other in compression. As understood, this behavior is achieved by providing the coupling parts with an elastically yieldable or bendable portion, in this case the groove's 22 lower lip 36, which, in engaged condition, is at least partially bent and in this way creates a tension force which results in the adjacent tile panels 10 being forced towards each other. FIG. 9 shows an assembly view of multiple panels of the type depicted in FIG. 4 with staggered alignment, e.g., installation without creating a four-panel corner intersection.

Where installation requires cutting one or more of the tile panels 10 conventional measuring and marking of the desired cut size and or shape followed by cutting with a conventional skill or table saw, preferably equipped with an electroplated diamond tipped blade, yields the desired cut to size piece needed for the application. This process is much easier than traditional ceramic and stone cutting which requires a large wet type saw and cutting process. Not only is the use of such equipment less convenient and more costly, technically, wet saws do not posses the range of motion/directional changes that can be exercised with table/skill saws. Thus, the act of cutting the inventive tiles itself, is considerably simplified over the traditional stationary wet-saw type process.

Production of the relatively thin veneer layer 28 from stone materials, e.g., granite, marble, limestone, and slate, typically requires cutting, grinding, or slicing from blocks or blanks. For such purposes, for example, stone fabrication equipment available from Pedrini, an Italian stone processing equipment manufacturer, provides marble, granite and/or stone slices from large blocks of native stone. Granite can be block sawed into strips adapted for use in the invention using a L'Arco di Trionfo M595 Modular Cutting Center. Quick sawing of marble blocks using a GS 131, a relatively new 4-column gang saw with a fixed height blade holder frame and a vertical movement block holder platform. The GS 131 type of device raises the targeted block towards the blade holder frame thereby providing high cutting frequency operations (90 cycles per minute) with very long cutting stroke (800 mm), using relatively short cutting blades. Thus, executing nearly flawless straight cuts is achievable even when working at the highest lowering speed. For granite processing, known grinding machines and techniques can be effectively employed to obtain the veneer for use in the present invention. Also multidisc cross cutting machines can be used in continuous cycle cutting of granite (as well as for softer materials).

For the foregoing, it should be readily appreciated that the tiles panels of the present invention are sturdier and lighter than sheets of stone or ordinary tile. Moreover, due to the overall more rugged nature of the laminated products, the risk of damage is lessened. Indeed, projections indicate upward of 50% (56.9%) less breakage from transport, handling storage of the inventive tiles over their conventional counterparts. An even more significant cost savings provided by the instant invention over conventional hard surface (stone, glass, ceramic) materials is in transport and energy costs required therefore. By one estimate the invention provides a transport cost savings averaging in excess of 40% (46%).

Referring now to FIGS. 10 through 14, an alternative embodiment of the invention is shown. In this embodiment, a modular tile assembly 110 is comprised of a substrate 120, at least one sealant layer 130, and at least one ceramic or stone tile 140. The substrate 120 of each tile assembly 110 may also be provided with either a tongue 124 or a complementary groove 126 defined, if and as desired, in one, some, or all of the respective peripheral side edges 122 of the substrate.

In a preferred embodiment, the substrate 120 may be formed from, for example, a hardwood, a processed wood or a paper material, such as, for example, conventional high density fiberboard, and the like. In one example, if the substrate 120 is formed from high density fiberboard, the fiberboard may have a finished product thickness swelling of less than about 20% when tested according to EN 13329. In another example, the high density fiberboard may have a finished product thickness swelling of less than about 15% when tested according to EN 13329. Alternatively, one will appreciate that the substrate 120 may be formed of a metal material, a polymer material, or a composite material, and the like, as desired or as required for the service environment in which the modular tile assemblies will be installed or used.

Figure 10:
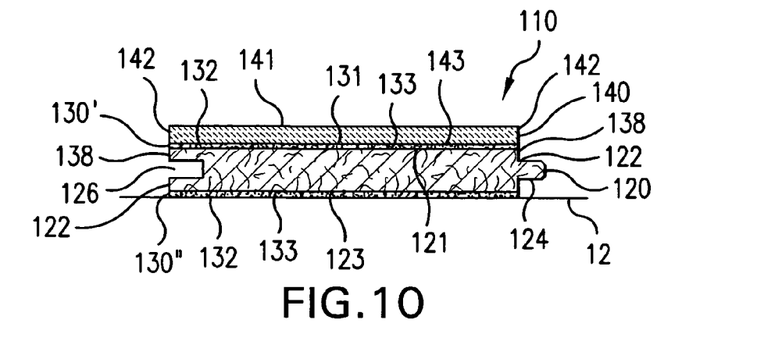
FIG. 10 is a cross-sectioned side elevational view of one embodiment of a modular tile assembly of the invention, showing a stone or ceramic surface tile bonded to an underlying sealant layer that is bonded to an underlying substrate.
Figure 11:
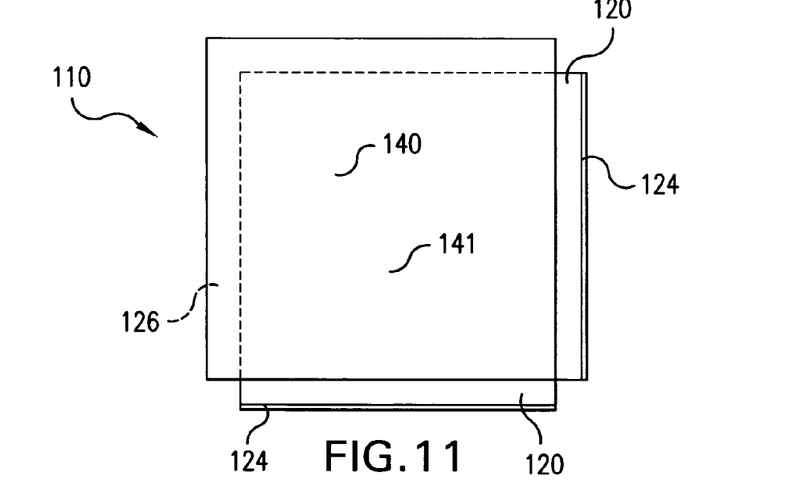
FIG. 11 is a top plan view of the tile assembly of FIG. 10.
Figure 13:
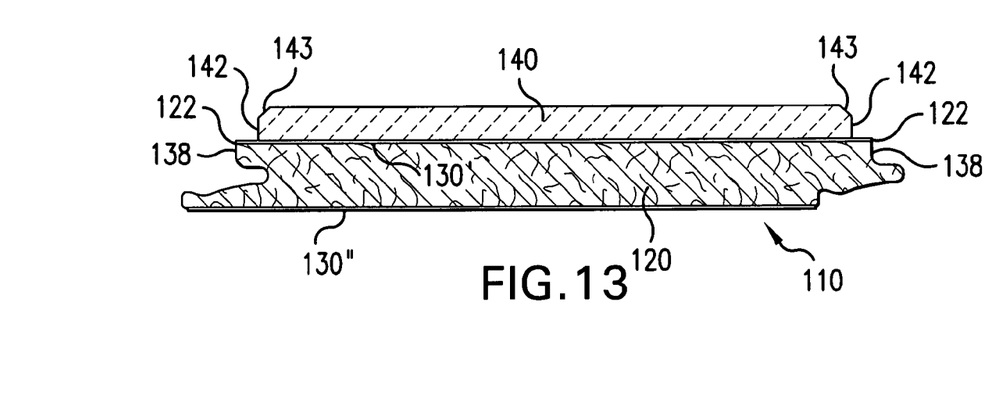
FIG. 13 is a cross-sectioned side elevational view of a modular tile assembly of the invention, showing a stone or ceramic surface tile bonded to an underlying sealant layer that is, in turn, bonded to an underlying substrate, and showing a "snap fit" tongue and groove side profile on the peripheral side edges of the substrate.
Figure 14:
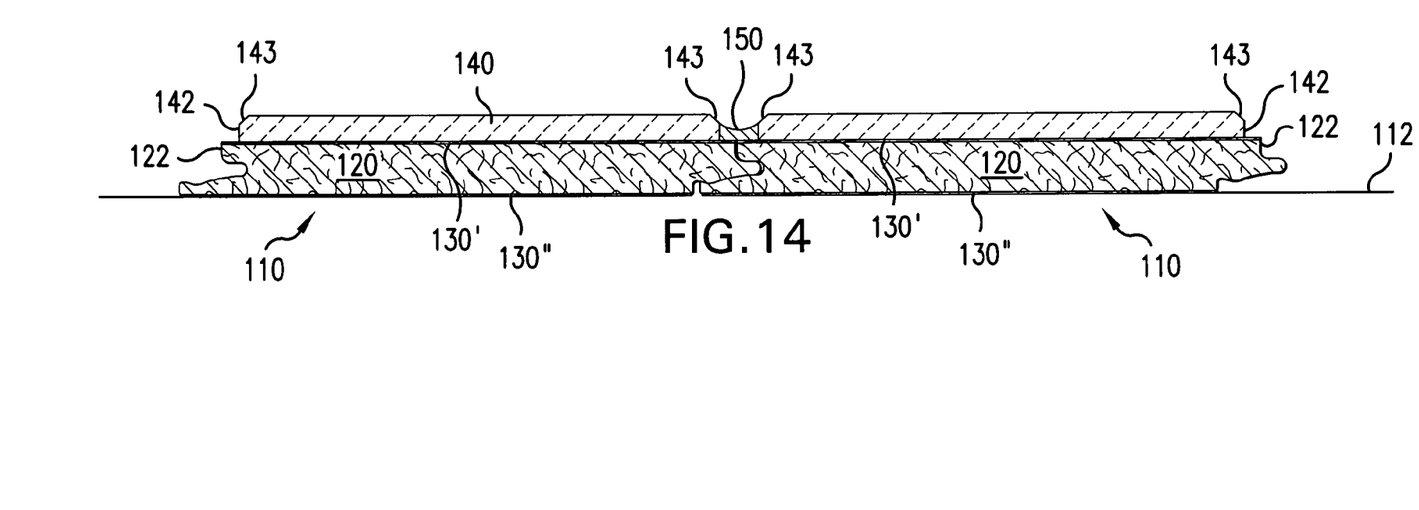
FIG. 14 is a partial cross-sectional side elevational view of connected first and second modular tile assemblies of FIG. 13.

The tongue 124 or the groove 126, if so provided, defined in any of the respective peripheral side edges 122 of the substrate may be conventionally formed, and may thus encompass any of the known types of tongue and groove profiles, whether formed as a "locking" or a snap-fit tongue and groove profile, as shown in FIGS. 13 and 14, or whether simply comprised as a tongue in groove sliding fit or joint, as shown in FIGS. 10 and 11. U.S. Pat. No. 6,006,486, which is incorporated in its entirety in this document by reference, describes an example of an embodiment showing such an exemplary locking tongue and groove profile.

A first sealant layer 130' of the at least one sealant layer 130 is mounted onto an upper surface 121 of the substrate 120 and is constructed and arranged to prevent moisture intrusion into the upper surface of the substrate. This may be accomplished by any known means of binding a sealant film 132 to the substrate layer to form the sealant layer 130'. The sealant film 132 may include, for example, a melamine sheet film, a phenolic backer film, and the like. In one example, a conventional adhesive may be used to bind the sealant film 132 to the upper surface of the substrate 120. In an alternative example, a conventional setting material may be sprayed and bonded onto the upper surface 121 of the substrate 120 to form the first sealant layer 130'. In either example, a bottom surface 133 of the first sealant layer is bonded to the upper surface of the substrate.

In an alternative example, the modular tile assembly may also comprise a second sealant layer 130". In this example, the top surface 131 of the second sealant layer is bonded to the lower surface 123 of the substrate so that the second sealant layer underlies the substrate. The second sealant layer may be bonded to the substrate as outlined above. The second sealant layer 130" is constructed and arranged to prevent moisture intrusion into the lower surface of the substrate and acts to provide a balanced moisture barrier (i.e., the first sealant layer on the upper surface of the substrate and the second sealant layer on the lower surface of the substrate).

Further, the modular tile assembly may also comprise an edge sealant layer 138 which is disposed onto at least a portion of the peripheral side edges 122 of the substrate. In one example, the at least a portion of the peripheral side edges is coated with a conventional sealant, such as, for example, by conventional vacuum coating. In one example, the conventional sealant may be an oil/wax material, a polymer coating, and the like. As one will appreciate, the first and second sealant layers and the edge sealant layer are substantially impermeable to moisture.

Each ceramic or stone surface tile 140 has a top face 141 and an opposed bottom face 143. The bottom face of the at least one tile 40 is bonded to the top surface 31 of the first sealant layer 130' by any known means of joining a stone or ceramic tile material to another material, for example, conventional adhesives. In one example, a suitable one-component thermo-setting urethane adhesive system, such as 3M Jet Weld™ TS-230, may be used. In an alternative example, a suitable one-component moisture curing urethane adhesive system, such as 3M Scotch® Multi-Purpose Adhesive 3481, may be used. In a further example, a suitable one-component synthetic rubber based adhesive system, such as 3M Scotch-Grip™ Industrial Adhesive 4408-NF, may be used. As one will appreciate, other equivalent or similar adhesives may be utilized as determined by the suitability of the conventional adhesive system used for the particular decor, manufacturing process, and finished product end use application. Adhesive application methods are conventional and will vary due to the previously mentioned determinants and may include, for example, extruded, spray applied, foaming applicators, or roller-coating application systems, and the like, using both warm and cold applied adhesive systems.

As one will appreciate, in another example, the bottom face 143 of the tile may be bonded directly to the upper surface 121 of the substrate 120. In this example, the adhesive used to bond the tile to the substrate serves as the first sealant layer 130'.

Each ceramic or stone tile 140 may be comprised of any known ceramic or porcelain material, as well as any natural or synthetic stone material, as desired. For example, and not by way of limitation, the stone material may comprise marble or granite. By way of example, the tile 140 may also be comprised of a plastic material or other synthetic man-made material formed, shaped, textured, or colored to look like a ceramic or a stone material. Moreover, the peripheral upper edges of the ceramic or stone tile 143 of the tile may be formed to have a beveled or otherwise rounded edge.

The ceramic or stone tile 140 will have a length and a width dimension complementary to that of the underlying substrate 120. That is, in one example, the length and the width dimension of the tile may be such that the lateral side edges 142 of the tile are substantially co-planar to the side edges 122 of the underlying substrate. In an alternative example, the length and the width dimension of the tile may be such that the lateral side edges 142 of the tile are spaced a predetermined distance from the peripheral side edges 122 of the underlying substrate. In this manner, as shown in FIG. 14, the lateral side edges 142 of the tiles 140 of adjoined modular tile assemblies are spaced apart a predetermined distance, which, for example, may be a conventional width for an industry standard grout joint.

It is anticipated that the respective modular tile assemblies 110 will be fastened to one another along their respective tongue and groove side edges in conventional fashion, as would be laminate flooring planks, for example. If not provided with tongue and groove side edges, the modular tile assemblies may be abutted with one another in conventional fashion, for example as is done for the known types of ceramic and stone tiles currently.

Figure 12:
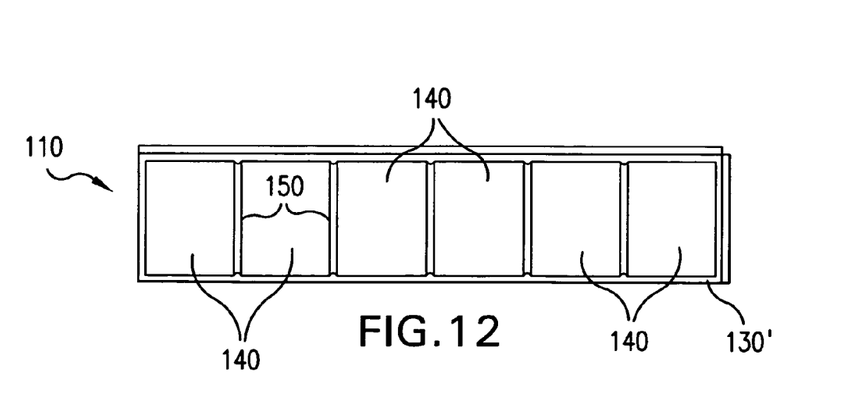
FIG. 12 is a top plan view of six stone or ceramic tiles mounted onto a common substrate.

It is contemplated that the completed individual modular tile assemblies 110 will be of any desired size (length and width), and may thus for example and not by way of limitation, be 8"×48" in size, as shown in FIG. 3, or be 12"×24" in size, all as desired. The modular tile assembly or modular tile assemblies may thus be formed as a single tile mounted onto the substrate, or may comprise a plurality of tiles 140 joined to one another on a common substrate 120, as shown in FIG. 12, with the desired grout or caulking 150 placed in the joint lines formed between adjacent ones of the tiles 40 carried on the common substrate. As shown in FIG. 12, the substrate 120 may be provided with a tongue or tongues, as well as a groove or grooves (not illustrated), all as described for the single modular tile assembly embodiment of the invention above, in any one, some, or all of the peripheral side edges 122 of the substrate 120, as desired.

In the typical installation, modular tile assemblies 110 are prepared at a location away from the installation site and delivered to the installation site. At the installation site, tile assembly 110 is placed on the installation surface (such as, for example a floor, a countertop, or a wall, and the like) and another tile assembly 110 is connected to the first tile assembly 110. This process is repeated until the desired installation surface is covered with connected modular tile assemblies 110, or portions thereof. After the tile assemblies 110 are installed, grout or caulk 150 is placed between adjoining modular tile assemblies 110 in the normal and well-known manner. A conventional grout may, such as, for example, Q-Set™ Purecolor caulk may be used.

In one example, during installation of the modular tile assemblies 110 of the present invention, the modular tile assemblies are placed onto the installation surface without adhering the tile assemblies 110 to the installation surface, either by cement, screwing, or other forms of adhesion. In this way, when the installation surface moves due to the house settling or otherwise, the formed surface made of the interconnected modular tile assemblies 110 will resist cracking because of greater allowance to move independently of the underlying installation surface. Alternatively, the modular tile assemblies may be secured to the installation surface either by cement, fasteners, adhesives, such as, for example, thin-set adhesive, and the like, singularly or in combination.

Although several embodiments of the invention have been disclosed in the foregoing specification, it is understood by those skilled in the art that many other modifications and embodiments of the invention will come to mind to which the invention pertains, having benefit of the teaching presented in the foregoing description and associated drawings. It is contemplated, as one-skilled the art will appreciate that the features described in the exemplified embodiments of the invention may be combined in any desired combination. It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention

What is claimed is:

1. A flooring tile, comprising:
a generally planar monolithic substructure sheet having a thickness of between 4 and 10 mm and defining an upper and lower surface of a select geometric configuration, said sheet defining at least a first and a second edges where the first edge features a profiled tongue structure projecting therefrom in a plane generally parallel to the upper surface and said second edge including a groove recess corresponding in shape and dimension to the profiled tongue of the first edge, where inserting said tongue structure of said first edge into the groove structure of said second edge interconnects abutting engineered tiles;
a sealant layer having a top surface and an opposed bottom surface, the bottom surface of the sealant layer being bonded to the upper surface of the planar substructure sheet; and
a veneer layer bonded to the top surface of the sealant layer, said veneer layer being composed of a material selected from the group consisting of sliceable natural stone, marble, granite, slate, glass, and ceramics, where said veneer has a thickness of 3-10 mm and possesses a Mohs hardness of at least 3.

2. A flooring tile according to claim 1, wherein the veneer layer is recessed from the edges of the substructure sheet and comprises a plurality of discrete segments disposed on the substructure sheet so as to provide uniformly spaced gaps having a depth corresponding to at least the thickness of the veneer layer and having a pre-selected width between adjacent segments for receiving and retaining grout.

3. A flooring tile according to claim 1, wherein the veneer layer has a breaking modulus greater than 30 N/mm$^2$.

4. The flooring the according to claim 2, wherein the tongue and groove profile force interlocked abutting panels towards each other in compression for glueless installation.

5. An engineered tile, comprising:
a generally planar monolithic base of selected dimensions and configuration, said base including an upper surface, a lower surface, a first edge incorporating a first cooperating element of an interlocking member, and a second edge incorporating a second cooperating element of said interlocking member;
a sealant layer having a top surface and an opposed bottom surface, the bottom surface of the sealant layer being bonded to the upper surface of the planar base; and
a veneer layer having a Mohs hardness of greater than 3 and a thickness of between 2 and 8 mm affixed to said top surface of said sealant layer, said veneer layer being dimensioned so as not to overlie said first cooperating member.

6. The engineered tile according to claim 5, wherein the veneer layer is composed of a material selected from the group consisting of sliceable natural stone, marble, granite, slate, glass, and ceramics.

7. The engineered tile according to claim 6, wherein the veneer layer is a ceramic of a type selected from the group consisting of Monocuttura ceramic, Monoporosa ceramic, porcelain ceramic, or multi-casted ceramic.

8. The engineered tile according to claim 5, wherein the veneer layer has a breaking modulus greater than 10 N/mm$^2$.

9. The engineered tile according to claim 8, wherein the veneer layer has a breaking modulus greater than 30 N/mm$^2$.

10. The engineered tile according to claim 6, where the veneer layer is sliced and polished natural marble of a thickness of between 4 and 6 mm.

* * * * *